United States Patent

Larson et al.

[15] 3,650,450

[45] Mar. 21, 1972

[54] MEANS FOR FORMING ELECTRICAL JOINTS BETWEEN INTERMEDIATE PARTS OF AN ELONGATED CONDUCTOR AND SELECTED CONDUCTIVE ELEMENT ON AN ELECTRICAL ASSEMBLY

[72] Inventors: Raymond B. Larson; Frank W. Wogoman, both of South Bend, Ind.

[73] Assignee: Wells Electronics, Inc., South Bend, Ind.

[22] Filed: Nov. 24, 1969

[21] Appl. No.: 879,234

[52] U.S. Cl. ..................................228/46, 219/85, 219/229, 228/52, 228/53

[51] Int. Cl. ........................................B23k 1/00, B23k 5/22

[58] Field of Search.................228/4, 46, 51, 53, 52; 219/85, 219/229, 230, 233

[56] References Cited

UNITED STATES PATENTS

| | | | |
|---|---|---|---|
| 3,097,286 | 7/1963 | Luke | 219/230 X |
| 3,056,317 | 10/1962 | Huber et al. | 228/46 X |
| 3,125,906 | 3/1964 | Johnson | 228/4 |
| 3,203,085 | 8/1965 | Turner | 228/46 X |
| 3,216,640 | 11/1965 | Szasz | 228/4 X |
| 3,271,555 | 9/1966 | Hirshon et al. | 219/236 |
| 3,313,464 | 4/1967 | Avedissian | 228/4 X |
| 3,358,897 | 12/1967 | Christensen | 219/230 X |
| 3,397,451 | 8/1968 | Avedissian et al. | 228/4 X |

*Primary Examiner*—John F. Campbell
*Assistant Examiner*—Richard Bernard Lazarus
*Attorney*—Oltsch & Knoblock

[57] ABSTRACT

A method and means for forming electrical joints between intermediate parts of an elongated conductor and selected conductive elements on an electrical assembly. The electrical assembly is mounted upon a shiftable support means. A shiftable soldering assembly is positioned above the support means and carries an intermediate part of the elongated conductor. The soldering assembly and support means are shifted relative to each other to cause the intermediate conductor part to be held against a selected conductive element. The intermediate conductor part is then heated to cause the stripping or melting of the insulation, if any, from the conductor part and the melting of the solder on the conductive element in contact with the conductor part. The conductor part is then cooled to permit the melted solder to adheringly solidify to the conductor part. With the conductor part so anchored to the electrical assembly the soldering assembly and support means are shifted relative to each other to cause another intermediate part of the conductor to be held against another selected conductive element. This last mentioned intermediate conductor part is heated and cooled to cause its adherence to the contacting conductive element in the manner previously described for heating and cooling the first mentioned intermediate conductor part.

5 Claims, 8 Drawing Figures

INVENTORS
RAYMOND B. LARSON &
FRANK W. WOGOMAN
BY
Oltsch & Knoblock
ATTORNEYS

INVENTORS
RAYMOND B. LARSON &
FRANK W. WOGOMAN
BY Oltsch & Knoblock
ATTORNEYS

INVENTORS
RAYMOND B. LARSON &
FRANK W. WOGOMAN
BY Oltsch & Knoblock
ATTORNEYS

MEANS FOR FORMING ELECTRICAL JOINTS BETWEEN INTERMEDIATE PARTS OF AN ELONGATED CONDUCTOR AND SELECTED CONDUCTIVE ELEMENT ON AN ELECTRICAL ASSEMBLY

BACKGROUND OF THE INVENTION

This invention relates to a method and means for forming selected solder joints on an elongated conductor.

In circuit boards there exists an inherent problem of making connections between selected circuit paths of a board. On large circuit boards the junction locations of the circuit paths are generally designated by pins and are selectively interconnected by measuring the distance between any two selected pins, cutting a length of insulated wire to extend between the selected pins, stripping the insulation from each end of the wire and wrapping or coiling each exposed wire end about a pin. In order to allow for sufficient room to wrap the wire ends about the pins, the spacing or center-to-center distance between pins must generally be not less than 0.100 inches. Additionally, only two terminal pins can be connected by a single length of wire.

With the advent of the transistor, circuit boards have been greatly reduced in size with the spacing or center-to-center distance between junction locations of the circuit paths being 0.050 inches or less. One means or technique heretofore used in connecting selected circuit paths of these small circuit boards is to utilize what has become known as a multilayer printed circuit. In this technique, a plurality of circuit patterns, generally formed by electrode deposit or etching processes, are layered one on top of another and separated by a thin dielectric film except where junctions between circuit patterns are desired. Because of tooling and production set-up costs, these multilayer printed circuits are extremely costly to produce in limited numbers.

In situations such as prototype constructions and custom-developed circuitry in which only a limited number of small circuit boards is required or desired, the wire-wrap technique discussed above would not be feasible due to size limitations and the multilayer printed circuit technique would not be feasible due to the cost and time factors involved. The subject matter of this invention deals with a method and means which will overcome the above stated disadvantages of the prior art in connecting circuit paths in small circuit boards having junction locations which are spaced less than 0.100 inches apart.

SUMMARY OF THE INVENTION

This invention relates to a method and means for forming electrical joints between intermediate or spaced parts of an elongated flexible conductor, such as a wire or ribbon, and selected conductive elements of an electrical assembly. The electrical assembly, which may take the form of a circuit board or other similar electronic means, is mounted upon a support means which is positioned preferably under a soldering assembly having a lower tip part which slidably engages an intermediate part of the conductor and positions said conductor part between the tip part and the support means. The support means and soldering assembly are shifted relative to each other to cause the intermediate conductor part to be held by the tip part against a selected conductive element. The intermediate conductor part is then heated to cause the stripping or melting of the insulation therearound, if any, and the melting of solder that is carried by either or both contacting portions of the conductive element and the conductor part. As the solder melts it flows about the insulation-free intermediate conductor part, assisted by means of a caipllary-type action. The melted solder is then permitted to cool and form a joint between the conductive element and the intermediate conductor part. With the conductor so joined to the electrical assembly, the soldering assembly and support means are again shifted relative to each other to cause a portion of the conductor to be drawn through the tip part of the soldering assembly and to position another intermediate conductor part against another conductive element. This last mentioned intermediate conductor part is then heated to remove the insulation thereabout, if any, and to melt the solder in contact with the conductor part and other conductive element. The melted solder is then permitted to cool to form a joint between the conductor part and other conductive element.

The above described sequence can be repeated as many times as desired with selected circuit paths being joined by the elongated conductor in a "stich-like" manner. When the desired number of circuit paths have been joined, the conductor need only be cut adjacent its last junction with the electrical assembly. When insulated conductors are utilized, the conductor connections between conductive elements may criss-cross and overlap indiscriminately. The method and means of this invention can be used to connect solder pads on a circuit board having closely grouped centers in an economic and rapid manner without expensive tooling and the involvement of extensive production techniques. Also the joints formed by this invention can be more easily repaired than the connections in a multilayer printed circuit board.

Accordingly, it is an object of this invention to provide an economical method for forming connections between circuit paths on an electrical assembly such as a circuit board.

It is another object of this invention to provide a method and means for forming connections between selected conductive elements of an electrical assembly in a rapid manner.

It is another object of this invention to provide a method and means for forming joints between intermediate parts of an insulated elongated wire and selected solder pads of a printed circuit board.

Other objects of this invention will become apparent upon a reading of the invention's description.

DESCRIPTION OF THE PREFERRED EMBODIMENTS

Figure 1:
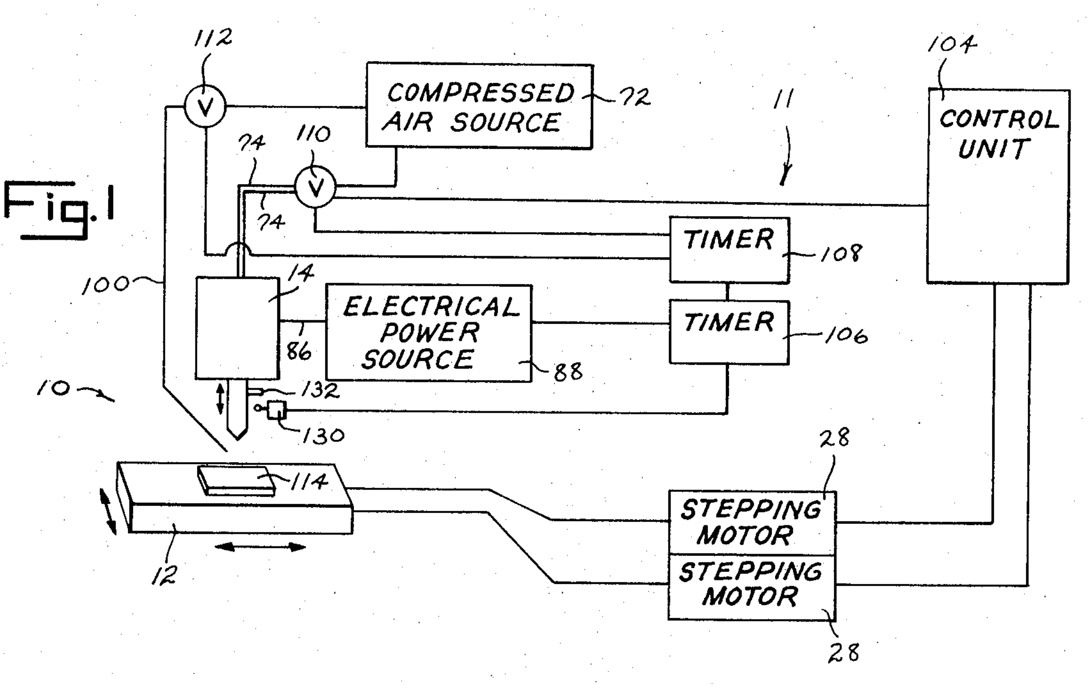
FIG. 1 is a block diagram of one embodiment of this invention.
Figure 2:
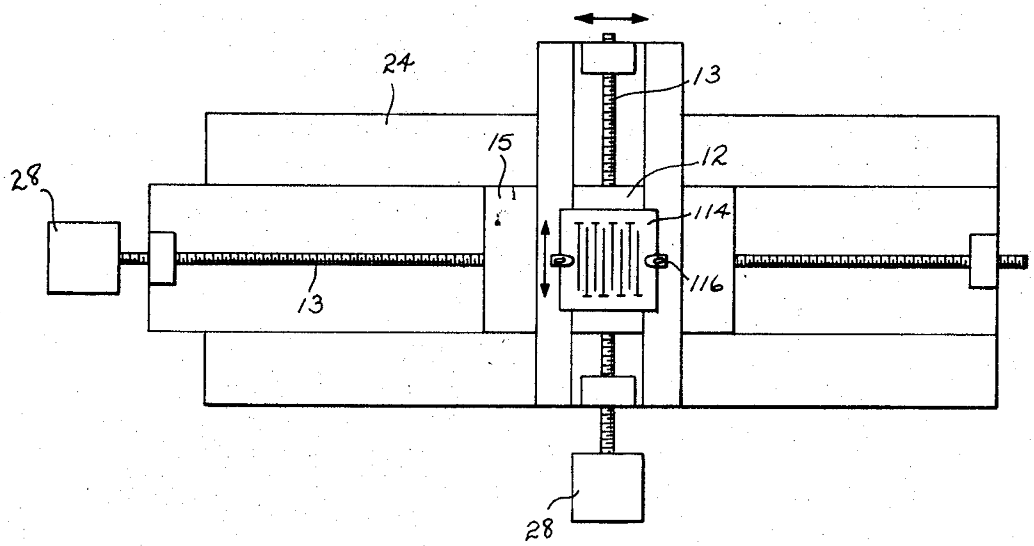
FIG. 2 is a top plan view of the support table of the illustrated embodiment of FIG. 1.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The preferred, non-limiting, means or apparatus for practicing this invention consists generally of a soldering machine 10, which includes various associated auxiliary units, and a plurality of control components, designated generally by the reference numeral 11, which serve to regulate the operative function of the soldering machine.

SOLDERING MACHINE

Soldering machine 10 includes a rigid frame supported bed 24. A horizontal table or support means 12 is carried by bed 24 and is preferably shiftable thereon along lateral and longitudinal axes in a substantially horizontal plane. Table 12 may be so shifted by means of crossed worm gears 13 each powered by a stepping motor 28. One gear 13 may engage a carriage 15 which supports and imparts longitudinal movement to table 12. The other gear 13 may be journaled to carriage 15 and engaged wit table 12 to impart transverse movement thereto. This means of table movement is well known and is not intended to be illustrative of the only means of causing selective lateral and longitudinal movement of table 12.

A head 14 is positioned over table 12 by means of a frame member 30. Head 14 includes laterally spaced parts 17 which are vertically disposed and rigidly connected to frame member 30. Parts 17 are interconnected at their upper and lower ends by plates 56 and 57 respectively. A plate 58 is positioned between plates 56 and 57 and extends from inner surface 19 of one part 17 to inner surface 21 of the other part 17. Head 14 preferably includes a vertically shiftable soldering assembly 32 which is mounted between head parts 17.

Figure 3:
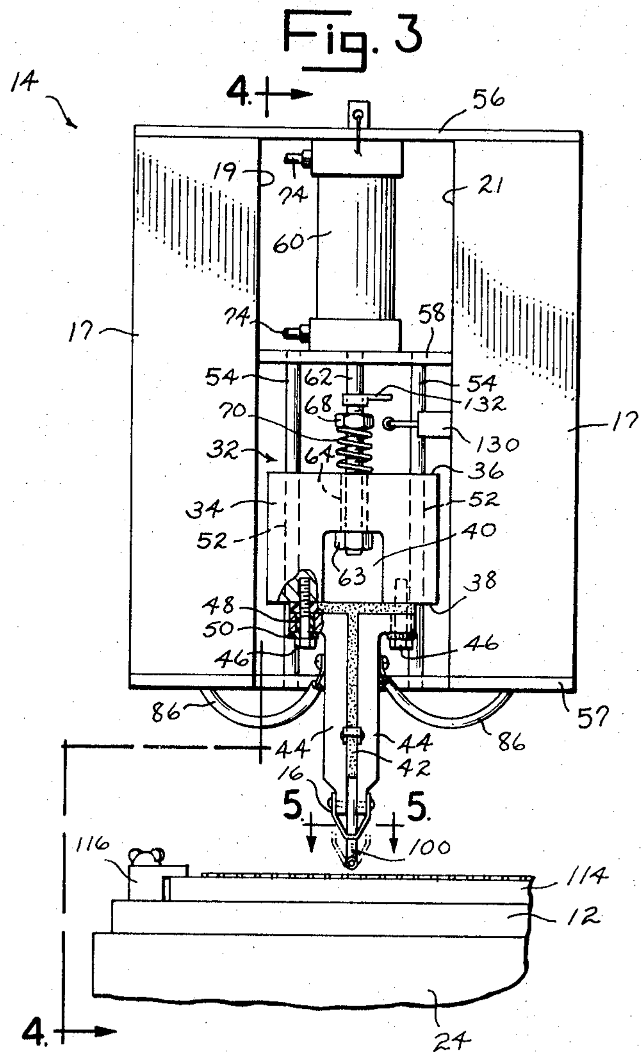
FIG. 3 is a fragmentary front elevation of the support table and soldering head of the illustrated embodiment of FIG. 1.
Figure 5:
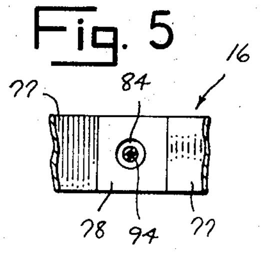
FIG. 5 is an enlarged fragmentary sectional view taken along line 5—5 of FIG. 3.
Figure 6:
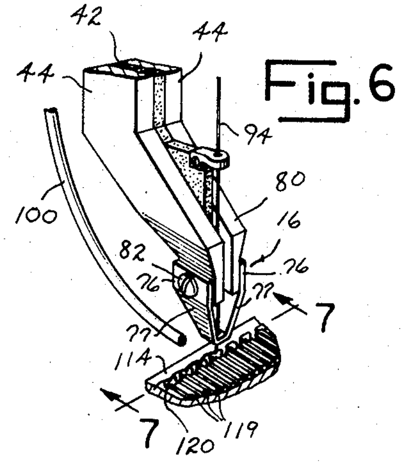
FIG. 6 is an enlarged fragmentary perspective view of the soldering tip of the soldering head shown in FIGS. 3 and 4.

Soldering assembly 32 preferably includes a slide block 34 having an upper face 36 and a lower face 38, a pair of rigid, downwardly extending spaced conductor members 44 which are positioned below and separated from slide block 34 and separated from each other by a dielectric spacer 42, and a tip part 16 which is connected across the free ends of conductor parts 44. Spacer 42 and conductor members 44 are connected to slide block 34 by means of bolts 46 which extend through registering apertures in the conductor members and the spacer and are threaded into face 38 of the slide block. Each bolt 46 may be constructed of a non-conductive material or electrically insulated from its receiving conductive member 44 by a dielectric sleeve 48 and a dielectric washer 50, as shown in FIG. 3. Slide block 34 is positioned between connecting plates 56 and 57 and has a pair of vertical bores 52 therethrough which are positioned at opposite sides of the block and preferably adjacent the rear thereof. A vertical guide pin 54 extends in a slide fit through each bore 52 and is rigidly secured at its ends to connecting plates 56 and 57. Lower face 38 of slide block 34 preferably has a central slot 40 therein which extends from the front to the rear of the lock between bores 52. A bore 64, preferably located forwardly of guide pin bores 52, extends downwardly through slide block 34 and opens into slot 40 therein.

Figure 4:
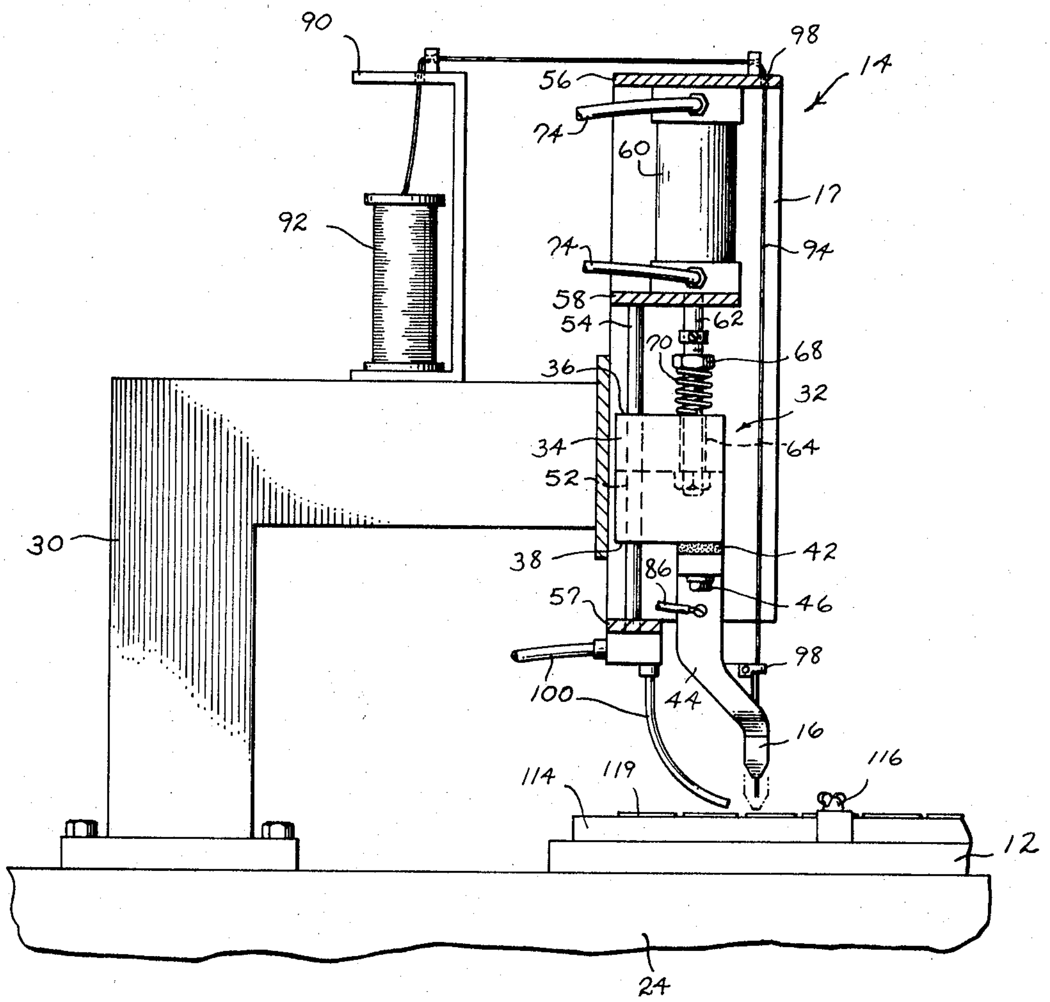
FIG. 4 is a fragmentary sectional view taken along line 4—4 of FIG. 3.

A pressure actuated power member 60, preferably comprising a cylinder and piston, is rigidly mounted to head 14 between connecting plates 56 and 57. Power member 60 includes a shiftable drive rod 62. Drive rod 62 extends substantially vertically downwardly through an aperture in plate 58 and bore 64 in the sliding block and into slot 40 where a retainer nut 63 is threaded thereon. Drive rod 62 freely received within bore 64 and is threaded between the sliding block 34 and connecting plate 58 so as to receive a nut 68. A helical spring 70 surrounds the drive rod and has one end engaging nut 68 and its other end engaging upper surface 36 of the slide block, as shown in FIGS. 3 and 4. Power member 60 is double-acting and is preferably actuated by air supplied by a compressed air source 72 which is interconnected therewith by conduits 74. Compressed air source 72 may consist of a compressor and a storage tank.

Referring to FIGS. 3–7, tip part 16 is a V-shaped strip of conductive material, such as molybdenum, tungsten, or stainless steel, to which solder will not readily adhere and includes spaced upper marginal tabs 76, converging sides 77 and a flat horizontal base 78. Each tab 76 of tip part 16 is secured to the free end 80 of a conductor member 44, preferably by means of a screw 82. Base 76 of the tip part has an aperture 84 centrally formed therein.

Figure 8:
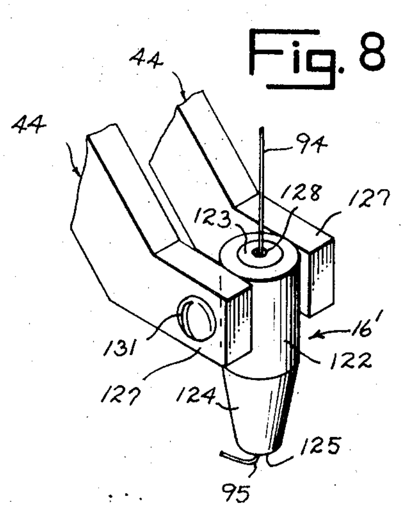
FIG. 8 is an enlarged fragmentary perspective view of a modified soldering tip of this invention.
Figure 7:
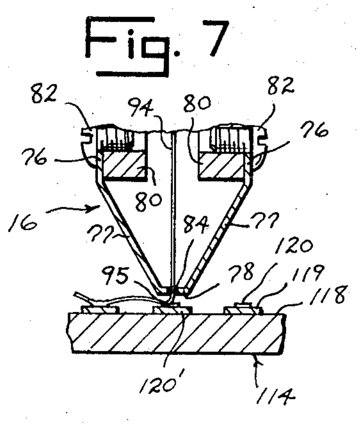
FIG. 7 is a sectional view taken along line 7—7 of FIG. 6.

FIG. 8 is illustrative of a modification of tip part 16. This modified tip part is designated by the reference number 16′ and is of a tubular shape having a conductive cylindrical body portion 122 and a conductive lower frusto-conical end portion 124. Tip part 16′ preferably includes an insulated or dielectric tubular insert 123 which extends through body portion 122 and into end portion 124, terminating slightly inwardly of end face 125 of portion 124. Tip part 16′ is positioned between and secured, such as by screws 131 (only one shown), to the modified free ends 127 of conductor members 44. Insert 123 which may be formed of ceramic material serves to limit and can even entirely prevent the heating of that portion of wire 94 which is surrounded by the insert. Also, insert 123 serves, in conjunction with conductive members 44, to concentrate the heat of tip part 16′ at end face 125 where wire part 95 would contact a solder pad. Thus, insert 123 serves the same function as the spacing of sides 77 of the V-shaped tip part 16 shown in FIGS. 3–7 in that the soldering heat is concentrated at end face 125 of tip part 16′ and at base 78 of tip part 16. When soldering with heat-strippable insulation coated wire, tips 16 and 16′ prevent the insulation from being stripped from the wire above wire part 95.

Each conductor member 44 has an electrical lead 86 connected thereto which interconnects the conductor part with an electrical power source 88. Power source 88 may be either AC or DC and preferably has a variable voltage output. A spool retainer 90 (see FIG. 4) may be mounted to the horizontal component of frame member 30 just rearwardly of soldering assembly 32. Spool retainer 90 journals a spool 92 of flexible wiring or a similar conductor which is of solderable conductive material such as copper, silver or nickel. This wire, designated generally by the numeral 94, is preferably between about 0.001 to 0.025 inches in diameter and may include a heat strippable insulative coating. The free end of wire 94 preferably extends from spool 92 forwardly over the top of head 14 and downwardly through a series of 98 and through aperture 84 in tip part 16. Aperture 84 need only be of sufficient size to permit the free end of the wire 94 to freely pass therethrough. The length and width of base 78 of tip part 16 are each preferably approximately two or three times the diameter of aperture 84 therein. When utilizing modified tip part 16′, wire 94 passes freely through axial bore 128 therein, as shown in FIG. 8.

To assist in cooling the solder joints formed by this invention, a coolant delivery conduit 100 may be mounted to head 14 at connecting part 57 and positioned, as shown in FIGS. 3 and 4, to direct the flow of coolant about the joint area. Coolant conduit 100 is preferably connected to compressed air source 72.

CONTROL COMPONENTS

Referring to FIG. 1, stepping motors 28 are electrically connected to a control unit 104. Control unit 104 is a commercially available device, such as an Icon Model 350 Controller, which takes stored data and converts this data into programmed electrical impulses. Certain of these impulses activate stepping motors 28. A trip-switch 130 is mounted to head part inner surface 21 and is electrically connected to a timer 106. A trip-lever 132 is adjustably secured to drive rod 62, preferably between connecting plate 58 and nut 68, and is adapted to engage and close switch 130 when rod 62 is extended a specified distance. Timer 106 is electrically connected to power source 88 and, when activated by the closing of switch 130, causes power source 88 to introduce an electrical current through conductor parts 44 and tip part 16 for a specified length of time.

A valve 110 regulates the flow of air between air source 72 and power member 60. Valve 110 is electrically actuated and serves also to reverse the flow of air into power member 60, thereby causing the extension and retraction of drive rod 62 thereof. Control unit 104 is electrically connected to valve 110 and activates the same to cause the extension of drive rod 62. A timer 108 is connected to timer 106 and, upon completion of the timing sequence of timer 106, opens a valve 112 which is positioned in coolant conduit 100 to permit air from compressed air source 72 to flow therethrough and around the joint area. Timer 108 is also electrically connected to valve 110 and after a specified time closes valve 112 and activates valve 110 to cause drive rod 62 to retract.

MANNER OF OPERATION

An electrical assembly such as a printed circuit board 114 is located atop table 12 and preferably secured thereto by means of clamps 116. The upper or exposed surface 118 of circuit board 114 has a plurality of circuit paths 119 formed thereon. Circuit paths 119 are generally formed of copper and are coated with thin films of solder, preferably at specific locations, to form solder elements such as pads 120. The solder pads 120 may be spaced as close as approximately 0.030 inches apart and the solder film on each pad is preferably at least 0.001 inches thick. If the solder does not contain a flux, it is preferably that the solder pads 120 be coated with flux, although it is possible to form the joints without a flux.

A taped operational sequence is inserted into control unit 104 which actuates stepping motors 28 to position a selected solder pad 120' of printed circuit board 114 below tip part 16 of soldering assembly 32. Control unit 104 then activates valve 110 to extend drive rod 62 of power member 60 and lower soldering assembly 32. Soldering assembly 32 is lowered until the intermediate part 95 of wire 94 (see FIG. 7) which projects from aperture 84 in tip part 16 contacts selected solder pad 120' and is held thereagainst by tip part 16. The amount of force tip part 16 exerts against the clamped intermediate wire part 95 is controllable and will vary depending upon the size and type of the wire. The stroke of rod 62 is preferably constant and is such that, when tip part 16 causes the intermediate part 95 of wire 94 to contact solder pad 120', the rod continues to move slightly downwardly relative to slide block 34 causing the compression of spring 70. The compressive force of spring 70 is proportional to the force tip part 16 exerts against the clamped intermediate wire part and can be varied by turning nut 68. It has been found that a satisfactory joint can be formed with a 0.004 inch insulated copper wire when the tip part force is 0.38 lbs.

At the end of the downward stroke of drive rod 62 and with the intermediate part 95 of wire 94 being held against solder pad 120' by tip part 16, trip-lever 132 on rod 62 contacts and causes the closing of switch 130 which activates timer 106 causing power source 88 to introduce an electrical current through conductor members 44 and tip part 16. This current flow causes tip part 16 to become heated in a manner well known in the art. The heat from tip part 16 causes intermediate wire part 95 in contact therewith to become heated so as to cause the melting or stripping of the insulation from the wire part, if the wire is insulated, and the melting of the solder pad in contact with the wire part. As the solder melts, it flows around and encloses the contacting wire part. The strength and duration o the current passing through conductor members 44 and tip part 16 required to melt the solder and insulation, if any, will vary depending upon the type and size of wire 94, the type of solder, and the thickness of the solder pad 120'.

After the solder pad 120' has been melted and the molten solder enclosed about the intermediate wire part, in some installations this will only require a fraction of a second for small diameter wires, timer 106 deactivates power source 88 and activates timer 108. Timer 108 causes valve 112 to open to allow air to pass through conduit 100 from air source 72 and onto the molten solder to accelerate its solidification. Tip part 16 continues to hold intermediate wire part 95 against the circuit board while the wire part cools and the solder sets. After the solder has been cooled and sufficiently set to anchor the wire part, for small diameter wires this generally takes about two seconds, timer 108 causes valve 112 to close and, preferably, simultaneously therewith activates valve 110 to cause power member 60 to retract drive rod 62 and raise tip part 16 from joined wire part 95. Once drive end 62 is retracted, control unit 104 activates stepping motors 28 to cause another solder pad 120 to be positioned under tip part 16 and in doing so causes a portion of wire 94 to be drawn through tip part 16. Control unit 104 then activates valve 110 to lower soldering assembly 32 until tip part 16 causes the intermediate wire part now in contact therewith to engage the selected solder pad. The heating of the tip part 16 and the remainder of the soldering sequence previously discussed is then repeated. This soldering sequence is then repeated until the prescribed circuit is completed. At this time wire 94 may be cut and the circuit board removed fro table 12.

Although the joint forming steps hereinabove described have been of an automatic sequence, it is to be understood that any one or all of the steps involving positioning of the circuit board relative to the intermediate parts of the wire and causing such wire parts to be held against selected solder pads on the board, causing the heating of the wire parts by a heating source, and causing the cooling of the wire part and molten solder in contact therewith could be performed manually. Also, the molten solder about the intermediate wire part could be atmospherically cooled without the use of cooling air from compressed air source 72.

As a modified form of soldering machine, tip part 16 could serve simply to hold an intermediate part of the wire 94 against a solder pad while a separate heated member is caused to contact the clamped intermediate wire part to strip the insulation, if any, from the wire part and cause the melting of the solder pad.

What we claim is:

1. Apparatus for forming joints between spaced parts of an elongated flexible conductor coated with heat strippable insulation and selected conductive elements of a group carried by an electrical assembly, wherein one of said conductor and group carries solder, comprising means for supporting said electrical assembly, a soldering assembly including a tip positioned adjacent said supporting means and having an opening therein through which said conductor is threaded, means for shifting at least one of said support means and soldering assembly relative to the other to position said tip adjacent a selected conductive element on said electrical assembly and to press the conductor part projecting from said tip in contact with said selected conductive element at said solder, and means for heating said conductor part to melt said solder where said conductor part and conductive element contact, said tip constituting of a V-shaped strip and having converging sides and an aperture formed therebetween through which said conductor is loosely threaded.

2. The soldering apparatus of claim 1 and means for introducing a coolant about said conductor part and molten solder to cause solidification of the solder and the adherence of the said conductor part and selected conductive element.

3. The soldering apparatus of claim 1 wherein said tip includes a substantially flat base disposed between the converging sides thereof and defining said aperture.

4. The soldering apparatus of claim 1 wherein said tip is formed of a conductive material and said means for heating said conductor part includes means for introducing an electrical current through said tip to cause heating thereof.

5. Apparatus for forming joints between spaced parts of an elongated flexible conductor coated with heat strippable insulation and selected conductive elements of a group carried by an electrical assembly, wherein one of said conductor and group carries solder, comprising means for supporting said electrical assembly, a soldering assembly including a tip positioned adjacent said supporting means and having an opening therein through which said conductor is threaded, means for shifting at least one of said support means and soldering assembly relative to the other to position said tip adjacent a selected conductive element on said electrical assembly and to press the conductor part projecting from said tip in contact with said selected conductive element at said solder, and means for heating said conductor part to melt said solder where said conductor part and conductive element contact, said tip being formed of a conductive material having a frustoconical shape, said tip having an axial bore therethrough and including a reduced end face, a dielectric tubular member fitted within said axial bore and terminating inwardly spaced from said reduced end face, said tubular member encircling said conductor with said part thereof projecting outwardly from said end face, said means for heating said conductor part includes means for introducing an electrical current through said tip to cause the heating of said reduced end face.

* * * * *